United States Patent [19]

Lundquist

[11] 4,303,513

[45] Dec. 1, 1981

[54] DUAL PICK-UP FUEL STRAINER ASSEMBLY

[75] Inventor: Roger J. Lundquist, Grand Ledge, Mich.

[73] Assignee: General Motors Corporation, Detroit, Mich.

[21] Appl. No.: 226,623

[22] Filed: Jan. 21, 1981

[51] Int. Cl.³ .......................................... B01D 35/02
[52] U.S. Cl. .................................. 210/132; 210/137; 210/314; 210/416.4
[58] Field of Search ............... 210/132, 137, 314, 317, 210/318, 340, 416.4

[56] References Cited

U.S. PATENT DOCUMENTS

| | | | |
|---|---|---|---|
| 2,367,055 | 1/1945 | Rike et al. | 210/416.4 |
| 3,282,428 | 11/1966 | Rosaen | 210/137 |
| 3,900,397 | 8/1975 | Bell | 210/416.4 |
| 4,201,044 | 5/1980 | Dodd | 210/132 |

OTHER PUBLICATIONS

The Parameters that Control the Performance of the In-Tank Fuel Strainer by Miller in SAE Technical Paper Series 790091, Society of Automotive Engineers, Warrendale, Pa. Feb. 26, 1979.
Reducing Low Temperature Wax Plugging in Fuel Systems of the Diesel Passenger Car by Muzatko in SAE Technical Series 800222, Feb. 25, 1980.
Cold Weather Fuel Requirements of Oldsmobile Diesels by Taniguchi and Benson, Feb. 25, 1980.

Primary Examiner—John Adee
Attorney, Agent, or Firm—D. D. McGraw

[57] ABSTRACT

A diesel fuel pick-up tube has two branches in the fuel tank. One is connected to a fuel strainer having openings of approximately 130 microns and the other is connected to a strainer having openings of about 400 to 500 microns. A vacuum relief valve is in the pick-up branch connected to the coarser strainer and is set to open at a predetermined amount of vacuum on the order of five inches of Mercury. The strainer with the finer mesh would therefore normally pass fuel but not wax crystals when the diesel fuel has reached the cloud point. Only if the finer mesh strainer is sufficiently clogged with wax crystals to cause the vacuum in the pick-up tube to open the relief valve would fuel be taken in through the coarser of the two strainers. Both strainers will prevent water from entering the pick-up tube.

1 Claim, 2 Drawing Figures

DUAL PICK-UP FUEL STRAINER ASSEMBLY

The invention relates to a fuel pick-up strainer arrangement particularly adapted for use in diesel engine vehicles. It is well known that diesel fuel at low temperature will reach a cloud point at which wax crystals are formed and held in suspension in the fuel. It is not desirable that these wax crystals enter the pick-up tube and be delivered to the engine. There have been previous proposals to prevent such wax crystals from entering the pick-up tube. Such proposals also utilize strainers so made as to prevent water from passing through the strainers and into the pick-up tube. The structure embodying the invention involves the use of two strainers connected in parallel so that fuel can be taken in through one or the other of the strainers to the pick-up tube and out of the fuel tank. The fuel strainer which is normally used in the system has a fine mesh on the order of about 130 microns. The other strainer connected to another branch of the pick-up tube is of a coarser mesh, preferably on the order of 400 to 500 microns. A vacuum relief valve is in the pick-up branch connected to the coarser strainer. This valve is normally closed. Only when the finer strainer is so clogged with wax crystals or other debris as to prevent the delivery of an adequate amount of fuel through the pick-up tube to the engine does the vacuum relief valve open. Once it opens, the fuel for the engine is then taken through the coarser strainer so that the engine is at no time starved for fuel because of wax crystal problems. Each of the strainers is so constructed and arranged as to prevent the entry of water which may be present in the fuel in the tank from entering the pick-up tube.

A discussion of strainers and strainer materials which may be used in systems of this type is found in S.A.E. Paper No. 790091 presented to and published by the Society of Automotive Engineers, Inc. (S.A.E.) in 1979. The Paper is entitled, "The Parameters that Control the Performance of the In-Tank Fuel Strainer". The Paper discussed basic engineering factors required to understand how in-tank fuel strainers function and includes guidance in choosing fabrics and weaves that ensure optimum performance for various types of liquid fuels.

United States patent application Ser. No. 146,479, filed May 5, 1980, entitled "Fuel Strainer Assembly", and assigned to the assignee to which this application is also assigned, shows a fuel strainer assembly having an inner sleeve and an outer sleeve, the outer sleeve acting to prohibit water from passing therethrough while allowing fuel to pass. The inner sleeve acts to permit fuel to pass therethrough but prohibits diesel fuel oil wax crystals from doing so when the fuel oil being strained is below the cloud point at which the wax crystals tend to be formed. The assembly provides for sufficient fuel to continue to be supplied to the engine even if the wax crystals clog the inner strainer sleeve. Openings at the lower end of the inner strainer sleeve through which fuel can still be taken in let the inner strainer be bypassed.

The invention embodying the invention herein disclosed and claimed provides a simple installation using two single filters of different types and providing for a positive shift from one filter or strainer to the other filter or strainer when necessary.

Figure 1:
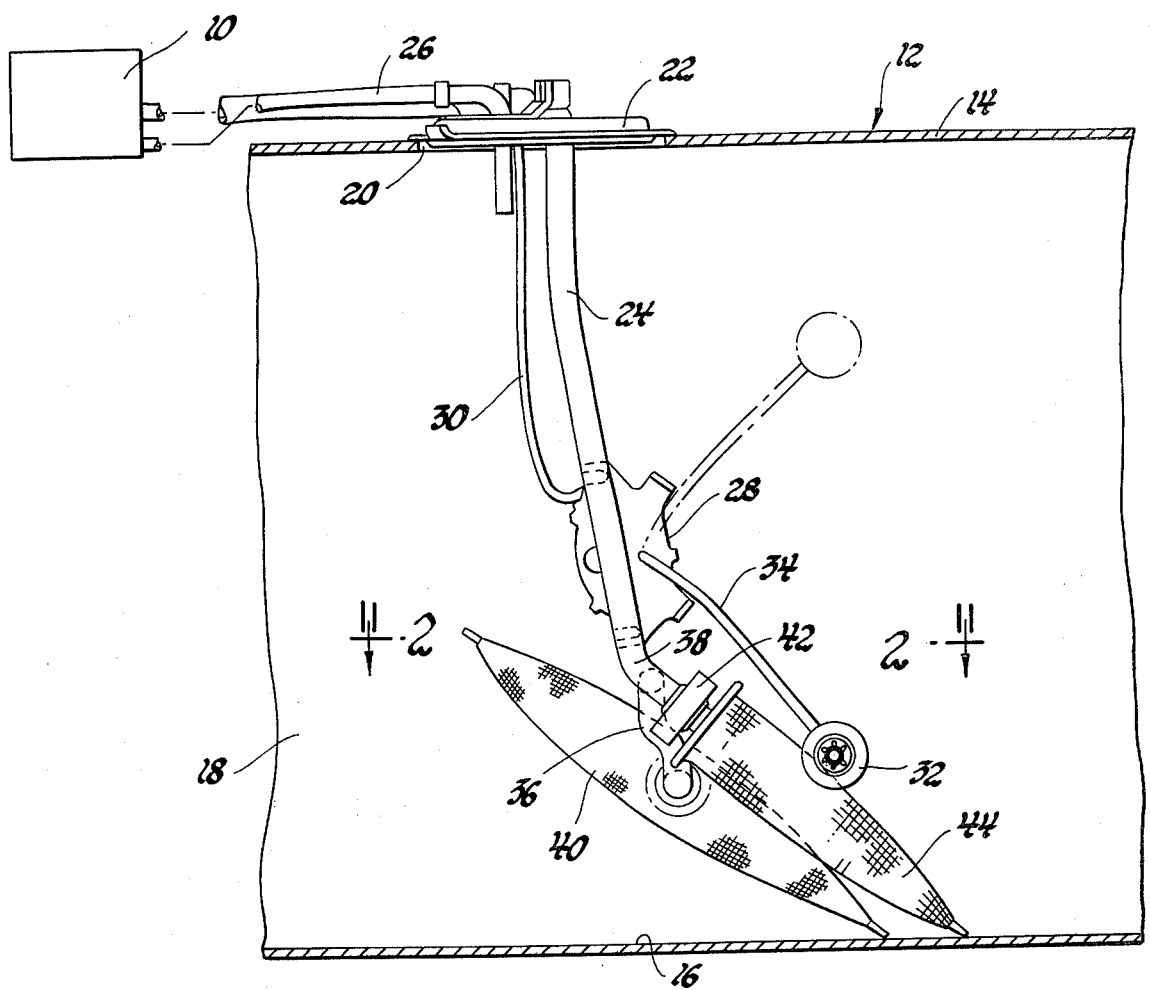
FIG. 1 is a cross section view of a portion of a vehicle fuel tank having the assembly embodying the invention installed therein, being somewhat schematic and having parts broken away and in section.
Figure 2:
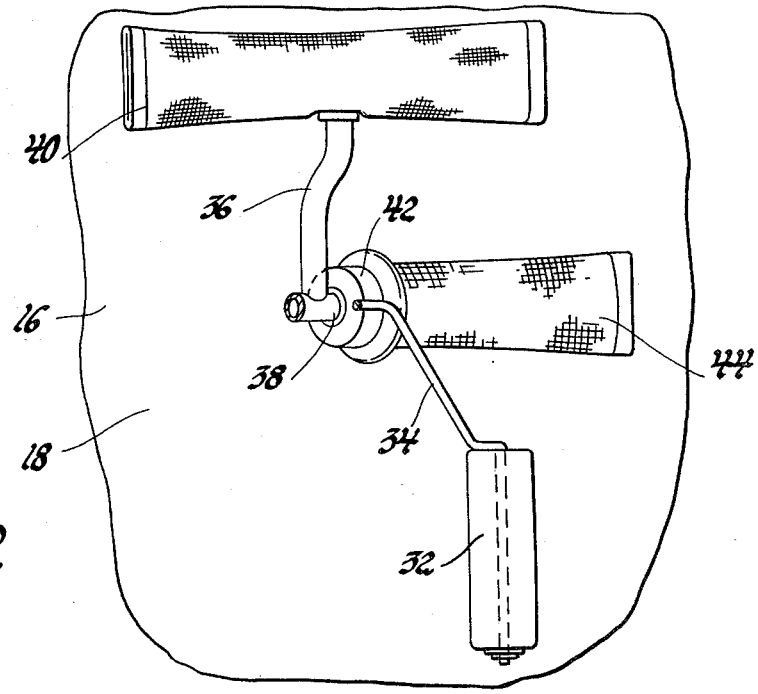
FIG. 2 is a plan view of the fuel strainer arrangement of FIG. 1 taken in the direction of arrows 2—2 of that Figure and having parts broken away and in section.

Typically the installation is in an automotive vehicle which is powered by a diesel engine 10. Although the invention may be used in stationary power systems, it will be further described in relation to an automotive vehicle.

The vehicle fuel tank 12 is illustrated as having a top section 14 and a bottom section 16 suitably joined together to define a volume for containing fuel. The interior of the tank containing the fuel is identified by reference numeral 18. It is common to have the fuel pick-up assembly and the fuel level sensor and signal sending mechanism so assembled that they may be installed and supported from the tank top. For this purpose, an opening 20 is provided in the tank top 14. The entire assembly is mounted to a cover 22 which extends entirely over the opening 20 and is suitably secured thereto in a sealed manner to prevent any fuel from leaving the tank about the cover or from having any dirt or other debris entering the tank at this point.

The engine 10 includes a fuel pump which provides sufficient suction on the fuel pick-up tube 24 to lift fuel from the tank and deliver it to the engine 10. A fuel pick-up tube 24 is illustrated as extending through the cover 22 and generally downwardly into the interior 18 of the tank 12. It is also common to have excess fuel delivered by the fuel pump to the engine so that a fuel return line 26 is provided. The excess fuel from the engine and fuel pump is returned to the tank interior 18 through the fuel return line 26. In the particular system illustrated, the fuel return line 26 passes through cover 22 and terminates shortly inside the interior 18 of the tank. The fuel level sensor and signal sending mechanism 28 is illustrated as being mounted to a portion of the fuel pick-up tube 24 and connected by suitable wiring 30 through the cover 22 to a signal mechanism available to the vehicle operator, not shown. The mechanism 28 is illustrated as having a float 32 mounted on a pivoted float arm 34 and sensing the level of the fuel in the tank interior 18.

Fuel pick-up tube 24 has a first inlet branch 36 and a second inlet branch 38 extending downwardly into the lower portion of the tank interior 18. A first fuel strainer 40 is secured to the inlet end of branch inlet 36 and is positioned as shown in FIG. 1 so that it can receive fuel from the tank interior 18 until the fuel in the tank is substantially exhausted. A normally closed vacuum relief valve 42 is positioned in the second inlet branch 38 so that it opens when sufficient vacuum is imposed within the fuel pick-up tube 24 and its branches by the engine fuel pump under certain conditions of operation to be described. A second fuel strainer 44 is secured to the inlet end of the second inlet branch 38 below the vacuum relief valve 42. Strainer 42 is also positioned in the lower portion of the tank interior 18 so that it is capable of removing fuel from the tank interior until the fuel therein is substantially exhausted.

The first fuel strainer 40 is made of a sufficiently fine mesh to prevent the passage therethrough of any wax crystals which may have been formed in the diesel fuel contained in the tank interior 18. It normally has sufficient area to permit the necessary amount of fuel to be picked up and delivered to the engine 10 even when some wax crystals clog portions of the mesh. However, under some severe wax crystal formation conditions, the first fuel strainer 40 may become so clogged as to almost starve the engine 10 for fuel. This will result in an increase in vacuum in the fuel pick-up tube 24 and the branch inlets 36 and 38. When this vacuum reaches a predetermined required value, for example about five inches of Mercury, the vacuum relief valve 42 will open and fuel may then be taken in through the second fuel strainer 44, the second branch inlet 38, the valve 42, and the fuel pick-up tube 24. This therefore bypasses the first fuel strainer 40 when it is so clogged. The second fuel strainer 44 is made with a somewhat larger mesh opening, on the order of 400 to 500 microns, so that it can pass fuel therethrough even including wax crystals which have been formed. This arrangement is made on the premise that it is more desirable to continue to deliver fuel to the engine 10 even with some wax crystals in it than it is to have the engine stop for lack of any fuel delivered to it. The strainers 40 and 44 are both so constructed and arranged and made of appropriate materials that they will prevent water from entering the fuel pick-up tube 24. Therefore under either condition of operation there will normally be no water pick-up with the fuel being delivered to the engine.

When the fuel in the tank warms sufficiently to melt the wax crystals about the first strainer 40, the vacuum imposed within the fuel pick-up tube 24 will then fall to such a value that valve 42 will close. At this point the fuel will again be taken in through the first fuel strainer 40 so that any wax crystals remaining in suspension in the fuel within the tank will be prevented from entering the pick-up tube 24.

The embodiments of the invention in which an exclusive property or privilege is claimed are defined as follows:

1. A diesel fuel pick-up and fuel strainer assembly comprising:
   a fuel pick-up tube having first and second branch-like inlets and a single outlet;
   a first fuel pick-up strainer attached to said first inlet and being made with a fine mesh having openings sufficiently small in the micron range, and made of a suitable material, so as to pass fuel therethrough but not fuel wax crystals or water;
   a second fuel pick-up strainer attached to said second inlet and being made with a coarse mesh having openings sufficiently large in the micron range, and made of a suitable material, so as to pass fuel and fuel wax crystals therethrough but not water;
   and a normally closed vacuum relief valve in said second inlet, said valve being set to open at a predetermined vacuum level corresponding to a predetermined functional decrease in the passing of fuel through said first strainer;
   said assembly when operating normally acting to strain and pick-up fuel through said first strainer and said first inlet, and operable, when said first strainer becomes so congested by fuel wax crystals or the like as to limit the amount of fuel strained therethrough with the result that a vacuum in said pick-up tube reaches said predetermined vacuum level to open said vacuum relief valve, to pick up fuel and fuel wax crystals suspended in the fuel through said second strainer and said second inlet.

* * * * *